United States Patent [19]

Keizer

[11] 3,911,476

[45] Oct. 7, 1975

[54] COLOR PICTURE/SOUND RECORD

[75] Inventor: Eugene Orville Keizer, Princeton, N.J.

[73] Assignee: RCA Corporation, New York, N.Y.

[22] Filed: Feb. 11, 1974

[21] Appl. No.: 441,069

[30] Foreign Application Priority Data

Mar. 20, 1973 United Kingdom.............. 13234/73

[52] U.S. Cl. ........................................... 358/4
[51] Int. Cl. ........................................... H04n 9/02
[58] Field of Search .................................... 358/4

[56] References Cited

UNITED STATES PATENTS 3,829,605 8/1974 Dickopp ................................ 358/4

*Primary Examiner*—Richard Murray
*Attorney, Agent, or Firm*—Eugene M. Whitacre; William H. Meagher

[57] ABSTRACT

An information track of a color-picture sound disc comprises geometric variations in the bottom of a spiral groove, the variations having alternations between a first cross-sectional shape in which the groove bottom and adjacent groove walls define a continuous smooth curve and a second cross-sectional shape in which the groove bottom is depressed relative to the groove bottom level associated with the first cross-sectional shape.

Recording apparatus for use in the mastering of such a color picture/sound disc and playback apparatus are also disclosed.

4 Claims, 13 Drawing Figures

COLOR PICTURE/SOUND RECORD

Figure 1:
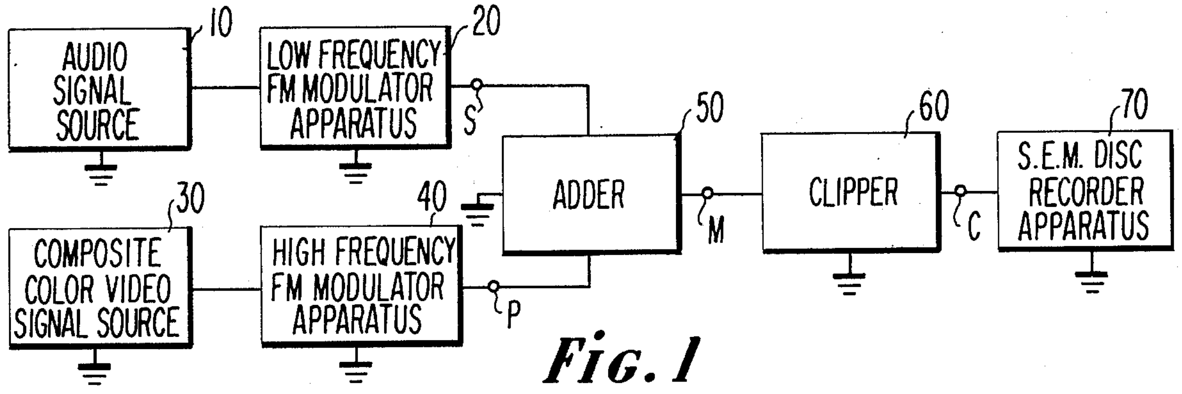

The present invention relates generally to a novel color picture/sound record, and particularly to a novel disc record structure permitting high density storage of related luminance, chrominance and sound information.

In U.S. Patent Application Ser. No. 126,772 filed Mar. 22, 1971, for Jon K. Clemens and entitled "Information Records and Recording /Playback Systems Therefor," now U.S. Pat. No. 3,842,194 issued on Oct. 15, 1974 video disc recording and playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information.

In one particularly successful format employed for the groove bottom information track in practice of the Clemens invention, depressed areas extending across the groove bottom alternate with non-depressed areas, with the frequency of alternation varying with the amplitude of video signals subject to recording. The form of the recorded signal is thus a carrier frequency modulated in accordance with video signals. In a preferred technique for recording the information on a video disc master, an electron beam subject to intensity modulation in accordance with FM carrier signals, impinges upon electron beam sensitive material in the master disc groove bottom, so that subsequent development leaves the desired relief pattern in the groove bottom.

Where it is desired to provide capability for color image reproduction from the information recorded on the video disc, one straightforward approach is to frequency modulate the picture carrier with a composite color television signal of the familiar NTSC format (employed for color television broadcasting in such countries as the United States and Japan). In the NTSC format, coloring information is added to a brightness-representative video signal through the use of a color subcarrier (at a frequency of 3.579545 MHz., hereinafter referred to as 3.58 MHz. for the sake of simplicity) which is effectively phase modulated in accordance with hue and amplitude modulated in relation to saturation. The color subcarrier signal represents the sum of 3.58 MHz. subcarrier wave of a first phase amplitude modulated in accordance with a first color-difference signal and a 3.58 MHz. subcarrier wave of a second phase, in quadrature with the first phase, amplitude modulated in accordance with a second color-difference signal.

When the unmodified NTSC format is employed for the signals used to frequency modulate the carrier in the above-described video disc system, several difficulties are encountered. Certain practical limitations in the recording process as to the highest instantaneous frequency readily recordable lead to limitations on the frequency deviation range to be associated with modulation of the picture carrier. The relatively high frequency location of the color subcarrier and its sidebands in the NTSC format thus results in a relatively low modulation frequency to frequency deviation ratio which tends to lower the signal-to-noise ratio attainable for the color signals. An additional serious problem is the development of undesired beats when using the unmodified NTSC format with its high frequency location for color information.

To appreciate the nature of the aforesaid beat problem, one must recognize that a difficulty encountered with the described recording of an FM carrier signal in the disc groove bottom is the tendency for a baseband signal to accompany the recorded FM carrier signal. Illustrative of a cause for such accompaniment is a tendency for the average depth of a slot to vary slightly in proportion to the closeness of spacing of slots, i.e., in proportion to the instantaneous frequency recorded, whereby there is a component of capacitance variation sensed during playback that varies in accordance with the baseband video signal employed to frequency modulate the picture carrier.

With baseband signal frequencies thus liable to appear in signals recovered from the disc during playback, beats can occur between the baseband signals and the FM signals. With an unmodified NTSC format placing the color subcarrier and its sidebands at the high end of the baseband, color signal presence can result in production of annoying beats of frequencies falling within the passband of the player's FM demodulator output, unless the range of instantaneous frequencies occupied by the FM signal is pushed considerably above the high end of the baseband. In view of the previously noted practical limitations on the highest instantaneous frequency conveniently recordable, location of the picture carrier deviation range appreciably higher than the band of frequencies occupied by the baseband signal in an unmodified NTSC format is not readily available as a solution to the noted beat problems.

A satisfactory and readily realizable solution to the noted beat problems (as well as the noted signal-to-noise ratio problem) may be provided, however, through use in the color signal recording and recovery systems of the "buried subcarrier" approach disclosed in the copending application, Ser. No. 350,777, of Dalton H. Pritchard, filed Apr. 13, 1973, now U.S. Pat. No. 3,872,498 and entitled "Color Information Translating Systems." Pursuant to such principles, a modulated color subcarrier (which may, for example, be of the general form employed in the NTSC system) is not placed at the high end of the luminance signal video band as in the NTSC system, but rather is "buried" within the video band, i.e., with the color subcarrier frequency chosen to be significantly lower than the NTSC subcarrier frequency value of 3.58 MHz., an illustrative choice being in the vicinity of 1.53 MHz., with the color subcarrier sidebands extending ± 500 KHz thereabout and with the luminance signal band extending well above the highest color subcarrier sideband frequency (to 3 MHz., for example).

The precise frequency of the subcarrier is chosen to be offset from a multiple of the line frequency ($f$ H) associated with the video signal by a fraction of the line frequency (preferably by $f_H/n$, where $n$ is a small integer greater than one). A particularly advantageous offset choice is a half line frequency ($f_h 2$) offset, although other offset choices may be appropriate under special circumstances (as, for example, where a PAL form is chosen for the subcarrier, and a quarter line frequency — $f_{H/4}$ — offset is suitable). An illustrative subcarrier frequency choice incorporating a $f_{H/2}$ offset is (195/2 $f_H$) (or approximately 1,534,091 Hz., when the line frequency corresponds to the United States standard for color television broadcasting of 15,734,26 Hz.).

To avoid annoying crosstalk effects, the luminance signal is comb filtered over the band of frequencies which is to be shared with the subcarrier and its sidebands; i.e., effectively a series of troughs are developed in the frequency spectrum of the luminance signal in which the subcarrier components may be "buried." Additionally, it is desirable that the modulated color subcarrier signal ("chrominance signal" ) is also comb filtered (in a complementary manner to that employed for the luminance signal) to effectively confine the chrominance signal to components that will fall in the troughs of the frequency spectrum of the comb filtered luminance signal. With the illustrative choice of half line frequently offset, the appropriate comb filter characteristic to be employed in preparing troughs in the luminance signal spectrum is one with recurring peaks at multiples of line frequency and recurring nulls at odd multiples of half the line frequency; the appropriate comb filter characteristic for the chrominance signal is the complement (with recurring peaks at odd multiples of half the line frequency and recurring nulls at multiples of line frequency).

By the illustrative location of the subcarrier at approximately 1..53 MHz., one may provide a reasonable bandwidth for the color sidebands (e.g., ± 500 KHz. about the subcarrier frequency, $f_s$, ) and yet retain a moderately wide band (e.g., 0–1 MHz.) at the low end of the signal spectrum which will be occupied solely by luminance signal components. Over the latter band of frequencies, the luminance signal is held free from loss of signal components.

When luminance signals and chrominance signals, prepared in the above described manner are combined, a composite signal is formed which may be recorded in the previously mentioned video disc recording system and subsequently recovered with substantial avoidance of the previously mentioned beat problems and with reasonable assurance of an acceptable signal-to-noise ratio. With provision of appropriate comb filter apparatus in the video disc player, the chrominance and luminance signal components occupying the shared band (e.g., approximately 1–2 MHz.) may be accurately separated from each other for application to suitable utilization circuitry.

In subsequent use of the chrominance signal components to supply the coloring information for an image reproduction, spurious coloring effects due to midband luminance components are substantially avoided, the avoidance being due to the described judicious application of comb filtering techniques. Also, in subsequent use of the luminance signal components to supply the brightness information for an image reproduction, spurious dot patterns due to the brightness effects of the midband chrominance signal components are substantially avoided, the avoidance being due to the described judicious application of comb filtering techniques.

While the foregoing application of the "buried subcarrier" principles of the Pritchard application to the disc system of the Clemens application results in a satisfactory arrangement for the recording storage and playback of related luminance and chrominance information so that the display of recorded color pictures may be effected, a further problem must be confronted to satisfy the normal desire to accompany the display of recorded color pictures with the reproduction of related recorded sound information.

In one approach to the recording/reproduction of accompanying sound information employed prior to the present invention, accompanying audio signals were caused to frequency modulate a high frequency sound subcarrier, with the frequency of the subcarrier chosen to be sufficiently higher than the highest video frequency to be recorded that the sound subcarrier deviation range and associated sidebands fell above the band of frequencies occupied by the composite video signals (e.g., fell above 3 MHz). Addition of the high frequency FM sound subcarrier signal components to the composite video signal provided a composite sound/video signal which was, in turn, used to frequency modulate a main carrier; after suitable clipping and processing, the resulting signal was applied to recording apparatus, such as the SEM recorder described in the aforesaid Clemens application. In playback, upon recovery of the FM main carrier signal, and demodulation thereof to obtain the composite sound/video signal, filtering was then employed to separate the high frequency sound subcarrier components from the lower frequency video components. The separated sound subcarrier components, after additional amplification and limiting, were applied to a second FM demodulator to recover the baseband sound signal.

While accompanying sound recording/reproduction may be realized by the above-described high frequency sound subcarrier techniques, difficulties accompanying such realization (particularly in view of the previously discussed practical limitations on the location of the main carrier frequency deviation range) are that, (1) the high frequency sound subcarrier produces beats and noisy edges in the picture, and (2) the signal-to-noise ratio of the demondulated sound subcarrier suffers because of the relatively low modulation frequency to frequency deviation ratio associated with its modulation of the main carrier.

It will be noted that the above-described difficulties are of similar character to those noted previously as undesirably accompanying use of a high frequency chrominance subcarrier (e.g., when recording composite color video signals of unmodified NTSC format). In one sense, however, the beat problem accompanying use of the high frequency sound subcarrier approach is even more bothersome than that accompanying use of a high frequency NTSC chrominance subcarrier. The nature of the chrominance subcarrier components are such that they do not appear during scanning of uncolored (black, white, grey) picture areas and are of low amplitude during scanning of low saturation (pastel) colored picture areas, wherefore the beat problem accompanying high frequency chrominance subcarrier used disappears in uncolored picture areas and is of lessened magnitude in low saturation colored picture areas. In contrast, the nature of sound subcarrier components is such that they are always present, wherefore the beat problem accompanying high frequency sound subcarrier use is associated with all picture areas, whatever their coloring content.

In disc recording apparatus embodying the principles of the present invention, accompaning audio signals are caused to frequency modulate a low frequency sound carrier over a low frequency deviation range (illustratively, approximately 200 KHz ±25 KHz.). The output of the sound carrier modulator is added to the output of a picture carrier modulator. In the picture carrier modulator, a composite color video signal (including luminance signals occupying a given band of frequencies, and chrominance signals appearing as sideband components of a modulated chrominance subcarrier interleaved with luminance signal components in an intermediate region of the given band) is caused to frequency modulate a high frequency picture carrier over a high frequency deviation range (illustratively, approximately 4–6 MHz.) The peak-to-peak amplitude of the sound modulator output is held at a level which is small relative to the peak-to-peak amplitude level of the picture modulator output, with an illustrative level ratio being 1:7. The resultant of combining the respective modulated carriers is applied to clipping means to develop an output which may be conveniently described as an impulse train having a repetition rate corresponding to the frequency of the frequency modulated picture carrier, and having a "duty cycle" which varies cyclically about a 0.5 value, with the frequency of said cyclic variation of "duty cycle" corresponding to the frequency of the frequency modulated sound carrier.

The duty cycle modulated output of the clipping means is amplified and processed for application to suitable recording apparatus. Illustratively, the recording apparatus is of the SEM recorder type described in the aforementioned Clemens application, with the intensity of the scanning electron beam controlled in response to the signal developed by the clipping means. As successive groove bottom regions of a grooved disc master, coated with a layer of electron beam sensitive material (forming a smoothly curved surface for the groove), pass through the electron beam path, the regions are exposed in a pattern determined by the intensity controlling signal such that, upon subsequent development, a pattern of geometry variations corresponding to the exposure pattern is established in the groove bottom of the disc master.

A stamper disc may be derived from the recording master, as by techniques described in the Clemens application, and utilized, in conventional record stamping machinery, to produce a plurality of replica discs of thermoplastic material, each replica disc having a surface groove, in the bottom of which appears an information track comprising geometric variations in the pattern established in the groove bottom of the recording master. The grooved surface of each replica disc is then covered, as described, for example, in the Clemens application, with a layer of conductive material and an outer coating of dielectric material overlying the conductive layer. The respective thicknesses are sufficiently small so that the conductive layer and overlying dielectric coating follow the contours of the groove and the groove bottom geometry variations therein.

Through application of the principles of the present invention to the recording process, as illustratively described above, the structure of each coated replica disc resulting therefrom is as follows: The groove bottom geometry variations comprise alternations between a first cross-sectional shape for the groove in which the coated groove bottom and adjacent coated groove walls define a continuous smooth curve, and a second cross-sectional shape in which the groove bottom is depressed relative to the groove bottom level associated with the first cross-sectional shape. The rate at which the alternations repeat along a given arcuate dimension of a groove convolution varies along the groove in accordance with the amplitude of a composite color video signal including components representative of the luminance and chrominance of the scanned image that has been subject to recording; the chrominance-representative components share with luminance-representative components, in interleaved fashion a midband portion of the band of frequencies associated with the composite color video signal, in a realization of the aforementioned "buried subcarrier" approach. The ratio of the longitudinal (along the groove) dimension of a depressed groove bottom region and the longitudinal dimension of an adjaent non-depressed groove bottom region varies along the groove in cyclical fashion about a value of unity. The rate at which the cyclic ratio variation repeats along a given arcuate dimension of a groove convolution varies in accordance with the amplitude of an audio signal representative of the recorded sound accompaniment for the recorded image-representative signals.

In further accordance with the principles of the present invention, appropriate playback apparatus is provided to recover the associated picture and sound information from a color picture/sound disc of the above-described type. The playback apparatus employs a stylus tracking in the groove of the coated replica disc as the disc is rotated. The stylus has a groove bottom engaging tip, including a support of insulating material, to which is affixed an electrode of conductive material having a bottom edge with an effective dimension along the groove which preferably does not exceed the longitudinal dimension of the narrowest of the groove bottom depressions impressed in the replica disc. As the disc rotates, the capacitance between the stylus electrode and the disc's conductive layer alternates between a maximum exhibited when a non-depressed region of the groove bottom passes beneath the stylus electrode, and a minimum exhibited when a depressed region of the groove bottom passes beneath the stylus electrode.

Detection means, coupled to the stylus electrode and responsive to the noted stylus-disc capacitance alternations, are provided for developing an electrical signal representative of the capacitance variations. The detection means has a sufficiently broad band response that the signal developed thereby is of the duty cycle modulated character discussed in the recording process description. That is, the detection means output comprises an impulse train having a repetition rate which varies in accordance with the amplitude of the recorded composite color video signal and a duty cycle which varies cyclically about a 0.5 value at a rate which varies in accordance with the amplitude of the recorded audio signal. Desirably, a broad bank preamplifier is coupled to the detection means for amplifying the duty cycle modulated signal prior to its application to picture/sound signal separation apparatus. The latter illustratively comprises respective bandpass filters, one encompassing the narrow bank occupied by the low frequency sound carrier deviation range and adjacent sideband regions, and the other encompassing the broad band occupied by the high frequency picture carrier deviation range and adjacent sideband regions. The output of the narrow band filter, after suitable limiting, is applied to a first FM demodulator to effect recovery of the recorded audio signals. The output of the wide band filter, after suitable limiting, is applied to a second FM demodulator to effect recovery of the recorded composite color video signals.

Figure 2A:
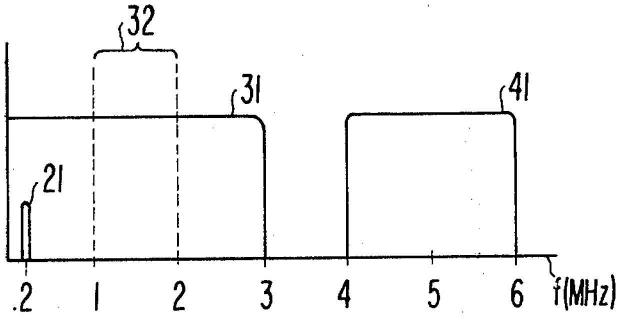
Figure 2B:
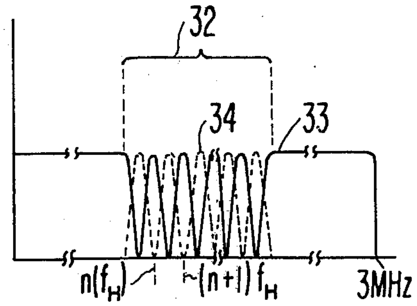
Figure 3A:
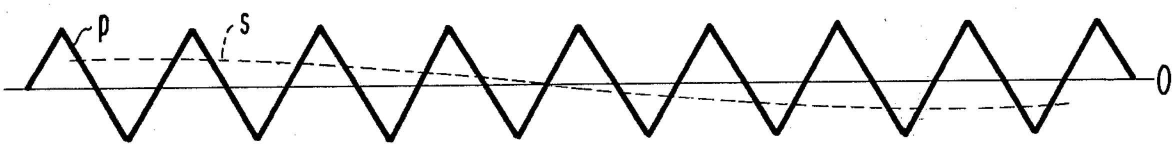
Figure 3B:
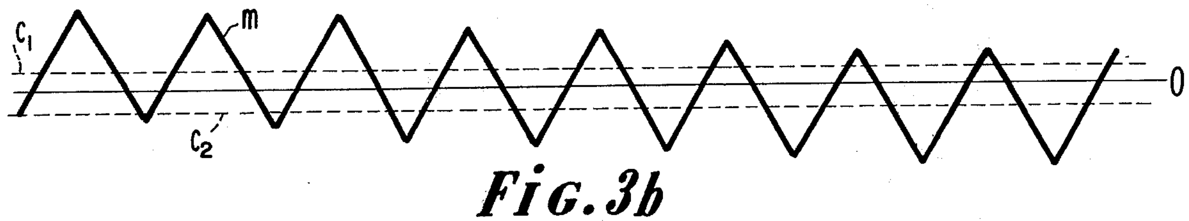
Figure 3C:
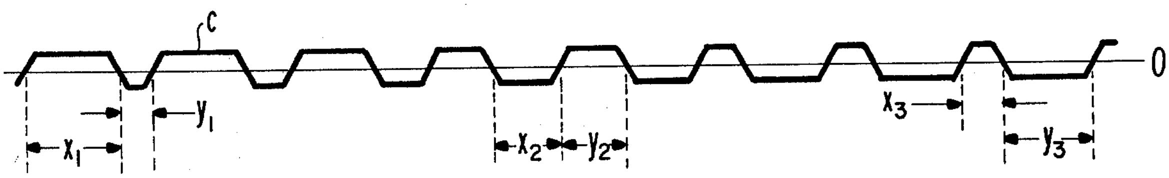
Figure 4:
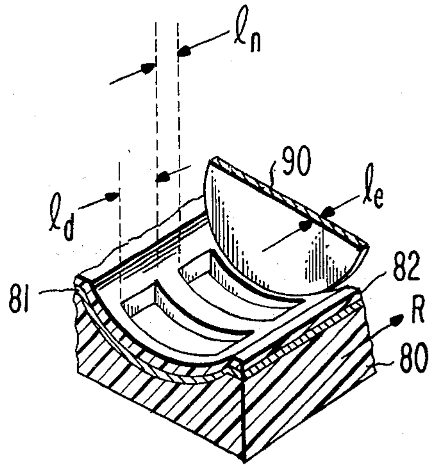
Figure 5A:
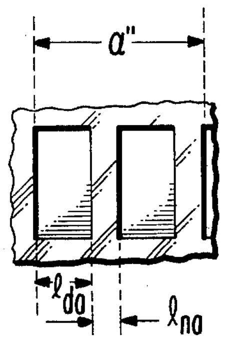
Figure 5B:
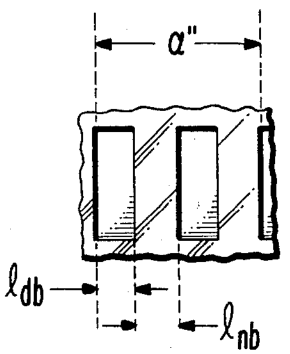
Figure 5C:
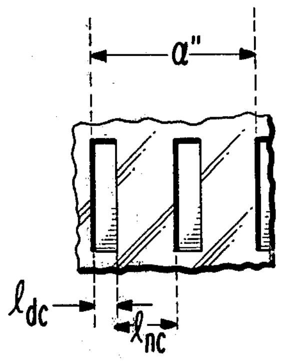
Figure 6A:
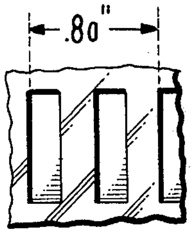
Figure 6B:
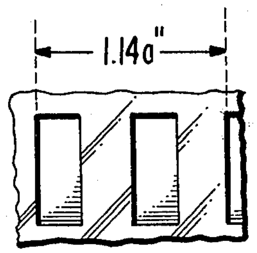
Figure 7:
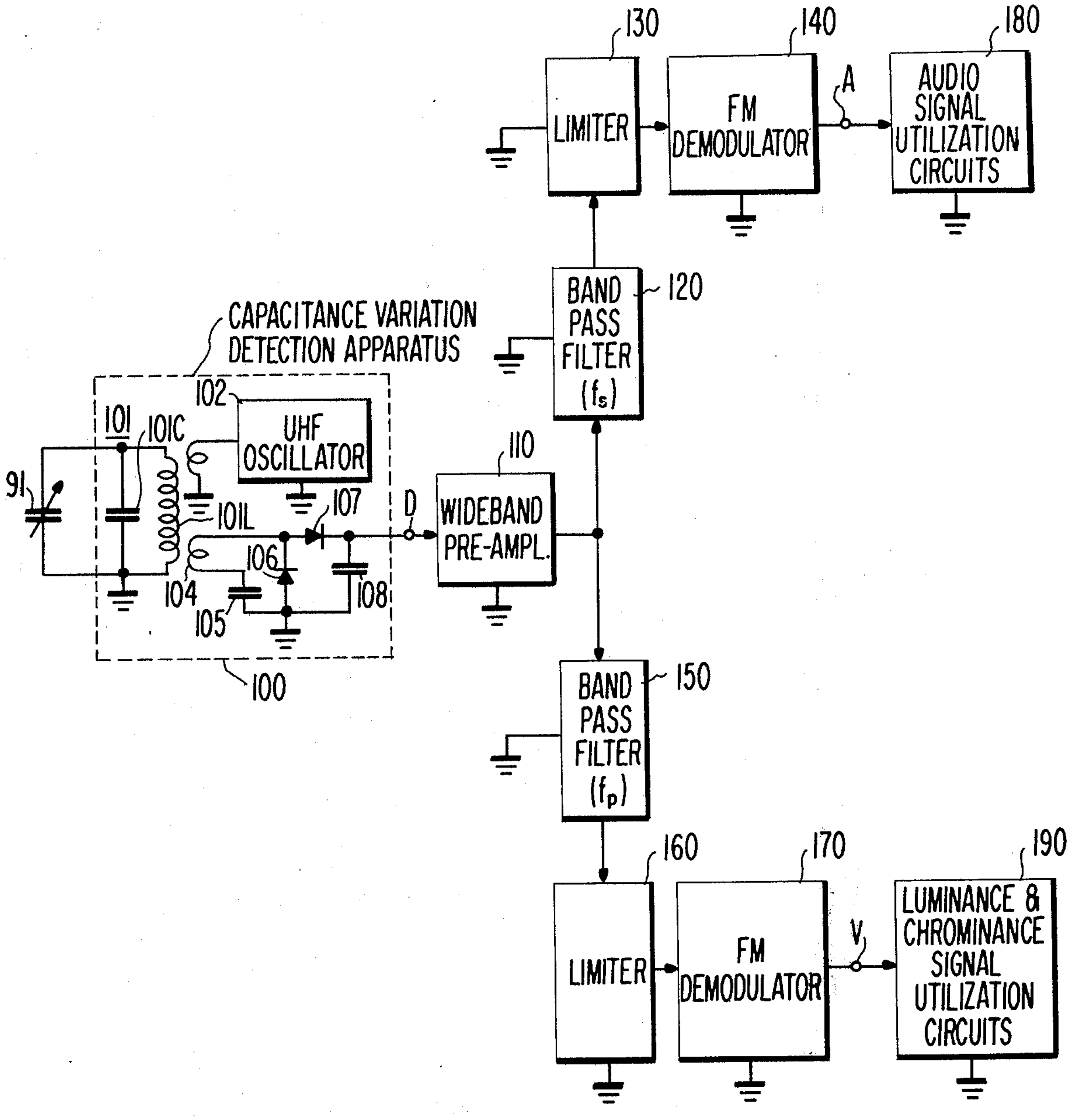

Objects and advantages of the present invention will be readily recognized by those skilled in the art upon a reading of the following detailed description and an inspection of the accompanying drawings in which:

FIG. 1 illustrates, in block diagram form, recording apparatus constructed in accordance with the principles of recording aspects of the present invention;

FIGS. 2(a) and 2(b) illustrate graphically frequency bands that may be associated with various signal components in the apparatus of FIG. 1 in accordance with a particular embodiment of the present invention;

FIGS. 3(a) and 3(b) and 3(c) illustrate graphically respective waveforms that maybe associated with the operation of the FIG. 1 apparatus in accordance with a particular embodiment of the present invention;

FIG. 4 illustrates, in a broken-away perspective view, a portion of a coated replica disc embodying principles of the present invention, the view revealing a small segment of a single groove convolution and the groove bottom information track therein, and also showing a segment of a stylus electrode as it is received in the groove during playback operations;

FIGS 5(a), 5(b) and 5(c) illustrate, in broken-away views, respective portions of a coated replica disc embodying principles of the present invention, the respective views revealing spaced segments of a single groove convolution and the groove bottom information track therein, in order to illustrate the effects on the disc structure resulting from the "duty cycle" modulation of the recording signal by the FM sound carrier;

FIGS 6(a), and 6(b) illustrate, in broken-away plan views, respective portions of a coated replica disc embodying principles of the present invention, the respective views revealing spaced segments of a single groove convolution and the groove bottom information track therein, in order to illustrate the effects on the disc structure resulting from variations of the FM picture carrier components of the recording signal; and FIG. 7 illustrates, partially schematically and partially in block diagram form, playback apparatus constructed in accordance with the principles of playbacck aspects of the present invention.

In the recording system of FIG. 1, a composite color video signal source 30 supplies a composite signal, inclusive of luminance information and encoded chrominance information representative of a succession of scannings of colored images to be recorded, to a high frequency FM modulator apparatus 40. The modulator apparatus 40, incorporating a suitable source of high frequency oscillations, functions to develop at its output terminal P a frequency modulated picture carrier signal, the instantaneous frequency thereof varying over a predetermined high frequency deviation range in accordance with the amplitude of the composite color video signal supplied by source 30.

The recording system of FIG. 1 further includes an audio signal source 10, which supplies an audio signal, representative of a desired sound accompaniment for the colored images being recorded, to a low frequency FM modulator apparatus 20. The modulator apparatus 20, incorporating a suitable source of low frequency oscillations, functions to develop at its output terminal S a frequency modulated sound carrier signal, the instantaneous frequency thereof varying over a predetermined low frequency deviation range (significantly lower in frequency than the deviation range of modulator 40) in accordance with the amplitude of the audio signal supplied by source 10.

The modulator apparatus 40 maintains the peak-to-peak amplitude of the FM picture carrier signal, developed at output terminal P, substantially constant at a given level. The modulator apparatus 20 also maintains the peak-to-peak amplitude of the FM sound carrier signal, developed at output terminal S, substantially constant, but at a level which is small relative to the FM picture carrier level (with an illustrative desired ratio of carrier levels being 1:7).

The respective outputs of modulator apparatus 20 and modulator apparatus 40 are supplied to an adder 50, which additively combines the two carrier signals. The resultant signal, appearing at the adder output terminal M, comprises a linear summation of the respective carrier signal input components, and is supplied to a clipper 60. The clipper 60 functions to symmetrically doubly clip the combination signal supplied to it from adder output terminal M. The clipping levels are chosen to limit the peak-to-peak amplitude of the clipped signal to a level less than the peak-to-peak amplitude level of the FM sound carrier input component. The clipped combination signal output of clipper 60 appears at clipper output terminal C, and is supplied as a recording signal input to suitable disc recording apparatus, illustratively comprising SEM disc recorder apparatus 70 (e.g., of the general form described in the aforementioned Clemens application).

In FIG. 2(*a*), illustrative frequency band parameters for use in the recording system of FIG. 1 are shown graphically. Curve 21 delineates the band limits of an illustrative sound carrier deviation range (200 KHz ± 25 KHz.) to be provided by the low frequency FM modulator apparatus 20, while curve 41 delineates the band limits of an illustrative picture carrier deviation range (4.3 – 6.3 MHz.) to be provided by the high frequency FM modulator apparatus 40. Curve 31 shows an illustrative passband (0–3 MHz.) for the composite color video signal supplied by source 30; an illustrative passband (not shown in FIG. 2*a*) for the audio signal supplied by source 10 is 30–15,000 Hz. Bracket 32 indicates an illustrative location, in a midband portion (1–2 MHz.) of the composite signal passband, for the encoded chrominance components of the composite color video signal supplied by source 30.

The midband location of the encoded chrominance components is rendered practical through use (in source 30) of composite signal development via the "buried sub-carrier" approach disclosed in the previously mentioned Pritchard application. In pursuit of that approach, a chrominance signal, formed by appropriate modulation of a chrominance subcarrier at a midband frequency (illustratively, of 195/2 times the horizontal line frequency, $f_h$, of approximately 1.53 MHz.) is limited to the illustrative midband portion (1–2 MHz.), and subjected to filtering by a "comb filter" with a characteristic having recurring nulls at multiples of the line frequency and recurring peaks at odd multiples of half the line frequency. The resultant combed passband for chrominance signal components is partially illustrated by the dotted-line curve 34 of FIG. 2(*b*).

In further pursuit of the buried subcarrier approach, the luminance signal, to which the combed chrominance signal is to be added to form the composite color video signal, is also comb filtered over the to-be-shared midband. The combing of the luminance signal, however, is effected with a comb filter having a characteristic complementary to that represented by curve 34 (i.e., having a characteristic with recurring peaks at multiples of the line frequency and recurring nulls at odd multiples of half the line frequency). The resultant midband-combed passband for the luminance signal components is partially illustrated by the solid-line curve 33 of FIG. 2(*b*). As suggested by the shape of curve 33, it is preferable not to continue the luminance signal combing through the unshared lowband portion (illustratively, 0–1 MHz.) to avoid undue loss of vertical detail. Also, as suggested by the shape of curve 33, it is preferable not to continue the luminance signal combing through the unshared highband portion (illustratively, 2–3 MHz.), although this is more tolerable than lowband combing (and may, in some instances, be necessary, as where the luminance signal is derived from a composite signal previously encoded in the NTSC format).

It should be noted that the illustrative frequency values presented in the above discussion of FIGS. 2(*a*) and 2(*b*) are appropriate for use in the recording system of FIG. 1 when the recorder apparatus 70 operates in a "real time" mode. However, where limits of attainable resist sensitivity and electron beam intensity, for example, require SEM recorder operation in a "slower than real time" mode, the frequency values given should be divided by the time expansion factor employed. Thus, for example, where the slow down mode involves rotation of the master recording disc at one-twentieth the intended rotational speed for replica disc playback, the illustrative frequency values are to be divided by 20.

FIGS. 3(*a*), 3(*b*) and 3(*c*) show illustrative waveforms for signals appearing at various points in the recording system of FIG. 1 to aid in explaining the system operation. In FIG. 3(*a*), dotted-line curve *s* represents the llow low sound carrier signal appearing at modulator output terminal S, while solid-line curve *p* represents the high frequency picture carrier signal appearing at modulator output terminal P. For ease of illustration, variations of the picture carrier wave frequency are not occurring during the time interval shown in FIG. 3 *a*. The waveshape of the sound carrier wave is desirably sinusoidal, as shown by curve *s;* while the waveshape of the picture carrier wave may feasibly be of various forms, a preferred waveshape (for reasons to be explained subsequently) is the triangular waveshape shown by curve *p*. While the peak-to-peak amplitude of the sound carrier wave has been shown in FIG. 3 a as less than the peak-to-peak amplitude of the picture carrier wave, as is desired, the relative level of the sound carrier wave has been exaggerated to facilitate graphic illustration of the results of carrier wave combing and clipping.

Curve *m* of FIG. 3 *b* corresponds to the sum of the respective carrier waveforms *s* and *p* of FIG. 3 *a*, and represents the combination signal appearing at the output terminal M of adder 50 in the FIG. 1 system. The appearance of the combination signal waveform is that of picture carrier waves with successive cycles swinging about an average value that undulates in sinusoidal fashion about zero at the sound carrier rate.

Illustrative clipping levels for the double clipping effected by clipper 60 in the FIG. 1 system are shown by the dotted lines $c_1$ and $c_2$ in FIG. 3 *b*. The result of the double clipping is shown by waveform *c* of FIG. 3 *c*, which represents the clipped signal appearing at the output terminal C of clipper 60. The waveform of the clipped signal, as shown, is that of an impulse train having a repetition rate corresponding to the frequency of the picture carrier wave, and having a duty cycle which varies at the rate of, and in consonance with, the sound carrier wave. A clipped signal cycle developed during the zero crossover of the sound carrier wave has equal duration positive and negative swings, the respective durations being indicated as $x_2$ and $y_2$ in FIG. 3 *c*. Defining "duty cycle," for illustrative purposes, as the ratio of the positive swing duration ($X_2$) to the period of a full cycle ($x_2 + y_2$), the condition obtaining during the sound carrier crossover is a duty cycle of 0.5 (or 50%, in terms of percentage). When the sound carrier swings away from zero in one direction, the clipped signal duty cycle increases above 0.5, as illustrated by the clipped signal swing durations $x_1$, $y_1$ at the left side of FIG. 3 *c*, where the ratio of ($x_1$) to ($x_1 + y_1$) exceeds 1:2. When the sound carrier swings away from zero in the opposite direction, the clipped signal duty cycle decreases below 0.5, as illustrated by the clipped signal swing durations $x_3$, $y_3$ at the right side of FIG. 3 *c*, where the ratio of ($x_3$) to ($x_3 + y_3$) is less than 1:2. Thus, the duty cycle of the clipper output varies cyclically about 0.5, with the frequency of the cyclic variation corresponding to the frequency of the sound carrier wave.

The illustrated triangular waveshape for the output of modulator 40 is advantageous in having rising and falling flanks having slopes of a useful and constant value, wherefore the desired degree of duty cycle modulation may be readily achieved with a linear relationship between the instantaneous amplitude of the sound carrier wave and the resultant duty cycle variation. A nonlinear relationship therebetween results when a sinusoidal waveshape (with varying-slop flanks) is employed for the picture carrier wave. A square-wave shape is to be avoided for the picture carrier wave, since the desired duty cycle modulation cannot be practically effected therewith.

In use of the waveform *c* as the recording signal input for the SEM disc recorder apparatus 70, illustratively the SEM electron beam may be unblanked for the duration of each positive swing of the clipped signal, and blanked for the duration of each negative swing of the clipped signal. Desirably, the sweep rate for the SEM beam is many times higher than the highest frequency of the picture carrier deviation range, and a plurality of partially overlapping sweeps of the SEM beam across the resist-coated groove bottom of the recording master disc occur during each unblanking period. As the disc rotates at a constant speed, a pattern of successive exposed and unexposed regions is developed, with the length (along the groove) of an exposed region determined by a given positive swing duration of the waveform *c*, the length of the succeeding unexposed region determined by the succeeding negative swing duration, etc. Assuming, for example, that the master disc groove coating is a positive resist, a subsequent development step will leave a pattern of alternating depressed and non-depressed regions in the groove bottom corresponding to the pattern of exposed and unexposed regions, respectively. That is, the length (along the groove) of a depressed region is determined by a given positive swing duration of the waveform *c;* the length of the succeeding non-depressed region is determined by the succeeding negative swing duration; etc. With constancy of beam sweep amplitude and unblanked beam intensity, the width (transverse to the groove) and depth of each depressed region is ideally contant. However, practical difficulties associated with electron distribution in the beam tend to provide a slight variation in the average depth of a depressed regions proportional to the length variations thereof (leading to the previously discussed problem of baseband signal presence).

When a stamper disc is derived (as by techniques described in the Clemens application) from a recording master subject to recording in the manner above described, it may be utilized to impress, by conventional stamping techniques, a plurality of replica discs, whereby the groove bottom pattern of the master is duplicated in each. Coating of a replica disc thus impressed with a first layer of conductive material, and a second overlying layer of dielectric material (as in the manner suggested in the Clemens application) prepares the replica disc for playback use. An illustration of a portion of a replica disc thus prepared is shown in perspective view in FIG. 4.

The replica disc portion illustrated in FIG. 4 includes only a segment of a single groove convolution. The showing of the impressed disc base 80, which is preferably of a thermoplastic material, such as vinyl, is broken away below its grooved surface for ease of illustration (since the base thickness is, illustratively, several orders of magnitude greater than the surface coating thicknesses). The grooved base surface (containing the previously described pattern of alternating depressed and non-depressed regions in the groove bottom) is covered by a layer 81 of conductive material, such as gold, which is sufficiently thin so as to smoothly follow the contours of the base groove and the groove bottom depressions therein. Overlying the conductive layer 81 is a layer 82 of dielectric material, such as polystyrene, also sufficiently thin so as to smoothly follow the contours of the groove and groove bottom depressions in the material beneath it. Although not separately shown because of its relative dimension, the surface of the dielectric layer 82 may desirably be coated with a film of a lubricant of electrically insulating character, illustratively of a methyl alkyl siloxane compound form as disclosed in the copending application of Dennis L. Matthies, Ser. No. 245,663, filed Apr. 19, 1972, now U.S. Pat. No. 3,833,408, "Improvement in the Manufacture of video Discs." Desirably, the insulating lubricant film is considerably thinner than the underlying layer 82.

The length of the groove segment shown in FIG. 4 is sufficient to reveal a pair of successive depressed groove bottom regions, the intervening non-depressed groove bottom region, and portions of the non-depressed groove bottom regions preceding and succeeding and depressed region pair. For illustrative purposes, the replica disc groove segment illustrated in FIG. 4 corresponds to a recording master groove segment which has been subject to exposure during application of a portion of recording signal waveform *c* inclusive of the swing durations designated $x_1$, $y_1$ in FIG. 3 *c*. As a consequence, the ratio of the length ($l_d$) of an illustrated depressed region to the length ($l_m$) of an adjacent non-depressed region is, as shown, greater than unity.

The illustrated replica disc segment is cut away transverse to the groove at the left of the perspective view of FIG. 4 to reveal the groove cross-section in a non-depressed groove bottom region. As shown, the cross-sectional shape in such a region is one in which the groove bottom and adjacent groove walls define a continuous smooth curve. Desirably, the shape of the curve approximates an arc of a circle, although other shapes, such as that of a sinusoidal segment, are tolerable.

In its representation of a recording signal of the waveform *c* nature, the groove bottom geometry variations which form the information track of the replica disc of FIG. 4 thus comprise alternations along the groove between a first cross-sectional shape in which the coated groove bottom and adjacent coated groove walls define a continuous smooth curve, and a second cross-sectional shape in which the groove bottom is depressed relative to the groove bottom level associated with the first shape. The rate at which the alternations recur along a given arcuate dimension of a groove convolution varies in accordance with the amplitude of a composite color video signal, inclusive of luminance and encoded chrominance components. Moreover, the ratio of the lengths of adjacent depressed and non-depressed groove bottom regions varies along the groove in cyclical fashion about a value of unity, the cyclical variation occurring at a rate representative of the amplitude of an accompanying audio signal.

To pictorially illustrate the effect of the sound carrier presence on the disc structure, FIGS. 5 *a*, 5 *b* and 5 *c* present plan views of spaced segments of a groove convolution of the replica disc of FIG. 4. Illustratively, the spaced segments correspond to spaced regions of a recording master subject to exposure during intervals of the recording signal waveform *c* of FIG. 3 *c* respectively inclusive of the swing durations designated $x_1$, $y_1$; $x_2$, $y_2$; and $x_3$, $y_3$. As the waveform portion illustrated in FIG. 3 *c* depicts a constant picture carrier component frequency condition throughout, this condition is reflected in the replica disc structure by appearance of the same rate of shape alternation in the groove bottom of the spaced groove segments of FIGS. 5 *a*, 5 *c*. As shown, the rate of shape alternation is such that two complete depressed regions and two complete non-depressed regions are encompassed within a given arcuate dimension of the groove convolution in each segment; illustratively, the dimension is several seconds of arc (and is designated *a* in the FIGS). However, despite this constancy of shape alternation rate in each segment, the structural pattern is different in each segment, because of the effect of the recorded sound carrier component.

Thus, in the FIG. 5 *a* segment, reflecting exposure signal swing durations $x_1$, $y_1$, the ratio of depressed region length ($l_{da}$) to non-depressed region length ($l_{na}$) is greater than unity. In the FIG. 5 *c* segment, reflecting exposure conditions during appearance of the recording signal swing durations $x_3$, $y_3$, the length ratio ($l_{dc}/l_{nc}$) is less than unity value for the length ratio ($l_{db}/l_{nb}= 1$) is shown in the FIG. 5 *b* segment, reflecting exposure conditions during appearance of the recording signal swing durations $x_2$, $y_2$. It will be appreciated that the groove length spacing between the respective segments illustrated in FIGS. 5 *a*, 5 *b* and 5 *c* is dependent upon the instantaneous frequency of the sound carrier, which varies with the recorded audio information.

To illustrate the effects of picture information on the disc'ss groove bottom structure, it shall first be assumed that the constant picture carrier frequency conditions illustrataed by waveform *c* and reflected in the shape alternation rate of FIGS 5 *a*, 5 *b* and 5 *c* are the result of scanning a dark gray image area which locates the instantaneous picture carrier frequency at an intermediate point (e.g., 5 MHz.) in the high frequency deviation range. Subsequently scanned is a brighter image area of a saturated color, resulting in a luminance component rise (in the white direction) and superposition thereon of a chrominance subcarrier component. During a given subcarrier half-cycle, the superimposed subcarrier component swings to a peak in the white direction. During this peak, the instantaneous picture carrier frequency output of modulator 40 increases appreciably (e.g., to 6 MHz.). The result of such a shift is shown in FIG. 6 *a*.

In the plan view of the replica disc groove segment of FIG. 6 *a*, the result of picture carrier frequency increase is seen to be a relative crowding of the shape alternations. As shown in FIG. 6 *a*, the arcuate dimension occupied by two complete depressed regions plus two complete non-depressed regions is only 0.8*a*.

To illustrate an opposite effect, one may consider the recording conditions which occur during a horizontal synchronizing pulse interval intermediate image line scanning time intervals. During the sync pulse tip occurrence, the picture carrier frequency drops to the low frequency end of the deviation range (illustratively, 4.3 MHz.). The effect of this downward shift in frequency on the disc groove bottom structure is shown in FIG. 6 *b*.

In the plan view of the replica disc groove segment of FIG. 6 *b*, the result of picture carrier frequency decrease during recording is seen to be a relative spreading of the shape alternations. As shown in FIG. 6 *b*, the arcuate dimension occupied by two complete depressed regions plus two complete non-depressed regions is enlarged to 1.14 *a*.

It will be noted that the discussion above has been in terms of a referencce arc length in seconds. In terms of arc subtended, the spacing between similar edges of successive depressions representing a given picture carrier frequency is the same in each groove convolution from outermost to innermost (when constant speed of rotation of the master is employed, as previously described). This is not true, however, in terms of physical spacing dimensions (e.g., in microns), since the spacing in such dimensions decreases in progression from outermost convolution to innermost convolution.

In playback of a coated replica disc of the form shown in FIG. 4, in order to recover the recorded information, use is made of a groove tracking stylus. As disclosed in the aforementioned Clemens application, the stylus includes a support of insulating material (e.g., sapphire to which is secured an electrode of conductive material (e.g., tantalum). The stylus tip is dimensioned for groove entry to a depth permitting the bottom of the stylus tip to engage the non-depressed regions of the groove bottom. The stylus tip bottom is curved with a shape substantially matching the curved shape of these regions. The effective electrode dimension along the groove when in playback position preferably does not exceed the longitudinal dimension of the narrowest depressed region in the disc's groove bottom. The longitudinal dimension of the support portion of the stylus tip, in contrast, is appreciably greater than the longitudinal dimension of the widest depressed region to ensure adequate support for the stylus by at least several non-depressed regions throughout playback. An illustrative form for the stylus electrode is a layer of tantalum deposited on the rear surface of the support,, with the exposed bottom edge of the layer curved for close engagement with the coated surface of the non-depressed regions of the disc's groove bottom.

In FIG. 4, the tip of an electrode 90 of the above-described form is partially shown, disposed in playback position with its curved bottom edge resting on the correspondingly curved dielectric surface layer of a non-depressed region of the disc's groove bottom. For purposes of drawing simplification, the support portion of the stylus tip is not shown, but it may be understood that it extends (to the left of the drawing) along the groove from the electrode location for a distance sufficiently long to permit its curved bottom surface to engage a plurality of non-depressed regions. In FIG. 4, $l_e$ represents the effective dimension along the groove of the electrode 90, which is small relative to the longitudinal dimensions ($l_d$ and $l_n$) of the depressed and non-depressed regions in the illustrated groove segment.

When a non-depressed region of the groove bottom is positioned beneath the electrode 90, as shown in FIG. 4, the curved bottom edge of the electrode is separated from the conductive disc layer 81 by a distance corresponding to the thickness of layer 82, and the separating space is mainly occupied by material (e.g., polystyrene) having a dielectric constant greater than the unity value for air. However, when a depressed region of the groove bottom is positioned beneath the electrode 90, the bottom edge of the electrode is separated from the conductive layer 81 by a greater distance, since the depression depth is large relative to the thickness of layer 82. Moreover, the separation space is mainly occupied by a material (air) having a dielectric constant of unity. Thus, maximum capacitance is exhibited between stylus electrode 90 and conductive layer 81 in the first-mentioned instance, and minimum capacitance is exhibited therebetween in the second instance. When the disc groove rotates as indicated by the arrow R in FIG. 4, the stylus-disc capacitance alternates between maximum and mininum capacitance in direct relation to the nature (depressed, or non-depressed) and dimensions of the groove bottom regions passing beneath the electrode. A playback apparatus arrangement, for using such capacitance variations in the recovery and separation of the various commponents of recorded information represented by the disc structure, is shown in FIG. 7.

In FIG. 7, variable capacitor 91 schematically represents the capacitance between the stylus electrode 90 and the conductive disc layer 81 of FIG. 4, the capacitance varying as disc rotation moves successive groove bottom regions beneath the stylus electrode. A capacitance variation detection apparatus 100, electrically coupled to the variable capacitor 91, functions to convert the capacitance variations of voltage variations at the detection apparatus output terminal D. The output signal developed at terminal D is of the general character of waveform *c* of FIG. 3 *c*, comprising an impulse train having a high frequency repetition rate which varies in accordance with the amplitude of the recorded composite color video signal, and having a duty cycle which cyclically varies about a 0.5 value at a low frequency varying in accordance with the amplitude of the recorded audio signal.

A wideband pre-amplifier 110 develops an amplified version of the duty cycle modulated impulse train for delivery to the inputs of a pair of bandpass filters, 120 and 150. Bandpass filter 120 has a relatively narrow passband encompassing the deviation range of the low frequency sound carrier ($f_s$) as well as the requisite adjacent sideband regions, and selectively passes the sound carrier component of the recorded signal to the relative exclusion of the picture carrier component thereof. Bandpass filter 150 has a relatively wide passband encompassing the deviation range of the high frequency picture carrier ($f_p$) as well as the requisite adjacent sideband regions, and selectively passes the picture carrier component of the recorded signal to the relative exclusion of the sound carrier component thereof. The outputs of the respective bandpass filters 120, 150 are passed via respective limiters 130, 160 (serving to eliminate undesired amplitude variations of the respective FM carrier components) to respective FM demodulators 140, 170.

FM demodulator 140 develops at its output terminal A the recorded audio signal, while FM demodulator 170 develops at its output terminal V the recorded composite color video signal. Appropriate utilization circuits (180, 190) of known types are coupled to the respective output terminals to enable use of the recovered audio, luminance and chrominance information in provision of a color picture display with sound accompaniment. Illustratively, the composite color video signal utilization circuits (190) may incorporate appropriate comb filter circuitry to effect separation of the midband chrominance subcarrier components from the accompanying luminance components, as disclosed in the aforementioned Pritchard application.

It may be noted that the frequency spectrum of the duty cycle modulated wave *c* of FIG. 3 *c* differs from the frequency spectrum of the undulating combination signal wave *m* of FIG. 3 *b* in that it incorporates additional higher order components, including components at frequencies of $2f_{pi} \pm f_{si}$ (where $f_{pi}$ is the instantaneous sound carrier frequency and $f_{si}$ is the instantaneous sound carrier frequency), such frequencies ranging to above 12 MHz. with use of the system parameters of FIG. 2 *a*. By virtue of the ability of the thin stylus electrode 90 to effectively respond to individual regions of the information track, one at a time, a capacitance variation waveform is established in playback which is of the duty cycle modulated form and includes the noted higher order components. A capacitance detecting arrangement, capable of response to the noted higher order components and development of voltage variations in the duty cycle modulated form is illustrated schematically for the detection apparatus 100 of FIG. 7.

In the illustrative capacitance detecting arrangement, the stylus-disc capacitance 91 serves as a variable capacitance element of a parallel resonant circuit 101. The associated reactance elements which establish the resonant circuit with the stylus-disc capacitance may take a variety of forms, but are represented schematically in FIG. 7 as the equivalent of the parallel combination of an inductor 101L and a capacitor 101C, in shunt with the stylus-disc capacitance 91. Reference may be made to the copending application of Stephen E. Hilliker, Ser. No. 295,854, filed on Oct. 10, 1972, now U.S. Pat. No. 3,872,265 and entitled "Video Disc Transmission Line and Stylus RF Return Systems," for an illustrative arrangement for suitably realizing the resonant circuit 101. A UHF oscillator 102 develops ultra-high frequency oscillations of substantially constant frequency and amplitude which are inductively coupled to the resonant circuit 101 via inductive element 103. The variable capacitance 91 varies the tuning of resonant circuit 101 over a range of frequencies slightly shifted from the oscillator output frequency, altering the circuit response to the injected oscillations. The amplitude of the oscillations developed across the resonant circuit 101 thus varies in accordance with the stylus-disc capacitance variations. The amplitude modulated VHF oscillations are applied via inductance element 104, inductively coupled to the resonant circuit, to an AM detector, of a voltage doubler type formed by capacitor 105, diode 106, diode 107 and capacitor 108. With suitable circuit parameter choices, the detected output follows the capacitance variation waveform and appears in the duty cycle modulated form discussed above, an advantageous input signal from for processing by the wideband preamplifier 110.

What is claimed is:

1. A color picture/sound record comprising:

a disc having a spiral groove in a surface thereof, said groove containing an information track comprising variations in the geometry of the groove bottom along a plurality of convolutions of said spiral groove;

said groove bottom geometry variations comprising alternations between a first cross-sectional shape for the groove in which the groove bottom and adjacent groove walls define a continuous smooth curve, and a second cross-sectional shape in which the groove bottom is depressed relative to the groove bottom level associated with the first cross-sectional shape;

wherein the rate of recurrence of the groove bottom depressions varies along a groove convolution in accordance with the recorded picture information inclusive of luminance and chrominance components;

wherein the ratio of the groove length of a depressed groove bottom region to the groove length of the succeeding non-depressed groove bottom region varies along a groove convolution in cyclical fashion; and wherein the frequency of the cyclical ratio variation varies in accordance with the recorded sound information.

2. A record in accordance with claim 1 wherein:

the variation of said rate of recurrence of the groove bottom depressions varies along a groove convolution is representative of a composite color video signal including a luminance signal component occupying a given band of frequencies, and a chrominance signal component in the form of a modulated color subcarrier and occupying a midband portion of said given band.

3. a color picture/sound record comprising:

a disc having a surface coated by a first layer of conductive material and a second layer of dielectric material overlying said first layer;

said disc having a spiral groove in said coated surface, said groove containing an information track comprising variations in the geometry of the coated groove bottom along a plurality of convolutions of said spiral groove;

said groove bottom geometry variations comprising alternations between a first cross-sectional shape for the groove in which the coated groove bottom and adjacent coated groove walls define a continuous smooth curve, and a second cross-sectional shape in which the coated groove bottom is depressed relative to the coated groove bottom level associated with the first cross-sectional shape;

wherein the rate of recurrence of the groove bottom depressions varies along a groove convolution in accordance with the recorded picture information inclusive of luminance and chrominance components;

wherein the ratio of the groove length of a depressed groove bottom region to the groove length of the succeeding non-depressed groove bottom region varies along a groove convolution in cyclical fashion; and wherein the frequency of the cyclical ratio variation varies in accordance with the recorded sound information.

4. A record in accordance with claim 3 wherein:

the variations of the rate of recurrance of the groove bottom depressions along a groove convolution are representative of a composite color video signal comprising the combination of (1) a chrominance signal having component frequencies substantially confined to a group of equally spaced spectral locations within a given band of frequencies and (2) a luminance signal having a first portion with component frequencies within said given band but substantially confined to a second group of equally spaced spectral locations bearing an interleaved relationship to said first group of spectral locations, and additional portions with component frequencies respectively above and below said given band.

* * * * *